UNITED STATES PATENT OFFICE.

PETER KINANDER, OF CHARLESTON, MISSISSIPPI.

FIRE-CLAY SUBSTITUTE.

1,056,031.  Specification of Letters Patent.  Patented Mar. 18, 1913.

No Drawing.  Application filed July 6, 1911. Serial No. 637,079.

*To all whom it may concern:*

Be it known that I, PETER KINANDER, a citizen of the United States, and a resident of Charleston, in the county of Tallahatchee and State of Mississippi, have invented certain new and useful Improvements in Fire-Clay Substitute, of which the following is a specification.

This invention relates to an improved substitute for fire clay, employed in lining fire boxes and laying fire brick; and the object of my invention is to provide a silicious refractory compound of a simple and inexpensive nature, which after being moistened with water and allowed to harden, is capable of sustaining high heat without fusion.

With these and other objects in view the present invention consists in the combination and arrangement of parts as will be hereinafter more fully described and finally pointed out in the appended claim.

In my present invention I provide a compound which is arranged to be sold in a dry state to be mixed with water to form a plastic compound, capable of being spread over the surface of a furnace to form a fire lining for the same, as well as being splendidly adapted to be used as a mortar in laying fire brick.

In carrying out the aim of my invention, I use a compound including one part of blue pottery clay, a one-half part of salt, a one-quarter part of ashes, a one-quarter part of fine white silicious sand, and one-eighth part of crushed glass. The parts are indicated by volume.

While I prefer using so-called blue pottery clay, it is of course understood that any other clay may be used.

The ingredients are mixed and placed in a grinding machine, where all the ingredients are thoroughly ground and comminuted. This dry flour-like substance is then sacked or put up in barrels or packages for shipment.

In using the compound it is simply necessary to add enough water to the compound so that the same will become plastic and pliable when the material is ready to be used as a mortar in laying fire brick or as a lining to be spread over the metal or brick surface of a fire pot.

Tests have been made with the above described mixture which was subjected to a heat of 2,200 degrees Fahrenheit without fusing. The fire clay substitute described in the foregoing specification can be cheaply prepared and readily applied, and being sold in a dry state can be readily shipped and handled.

Having thus described my said invention, what I claim as new and desire to secure by United States Letters Patent is:

A refractory silicious compound comprising one part clay, one half ($\frac{1}{2}$) part salt, one-quarter ($\frac{1}{4}$) part ashes, one-quarter ($\frac{1}{4}$) part white sand, one-eighth ($\frac{1}{8}$) part glass, the entire mixture being finely pulverized, to be mixed with water.

In testimony whereof I affix my signature, in presence of two witnesses.

PETER KINANDER.

Witnesses:
W. B. BURKE,
E. B. McCULLOUGH.

---

Copies of this patent may be obtained for five cents each, by addressing the "Commissioner of Patents, Washington, D. C."